United States Patent Office 3,516,897
Patented June 23, 1970

3,516,897
ADHESIVE FOR BONDING A REINFORCING
ELEMENT TO A RUBBERY COMPOSITION
John G. Brodnyan, Langhorne, Pa., assignor to Rohm &
Haas Company, Philadelphia, Pa., a corporation of
Delaware
No Drawing. Filed Oct. 27, 1966, Ser. No. 589,806
Int. Cl. C08g 37/38; C08c 9/16; B26b 25/10
U.S. Cl. 161—92                                    8 Claims

ABSTRACT OF THE DISCLOSURE

This invention relates to an improved adhesive for bonding a reinforcing element of textile materials, such as tire cord, to rubber and other elastomers. More particularly, it relates to an improved adhesive consisting of a mixture of a polymer latex comprising carboxylate and hydroxyl group functionality with a blended phenolic-aldehyde-rubber latex (R/F/L).

---

There is a need for improved adhesives in the bonding of synthetic reinforcing fibers, such as viscose rayon and nylon fibers, to rubber and the like in order to effect a strong bonding between the reinforcing fibers and rubber, both at normal and at elevated temperatures. In the manufacture of such reinforced articles as pneumatic tires, power-drive belts, conveyor belts, high pressure hose and the like, the useful life of these articles depends to a great extent upon the bond secured between the reinforcing element or cord and the rubber.

Various adhesives are disclosed in the prior art for bonding a reinforcing element, usually a textile material, to rubber. Recent patents relating to the bonding of tire cord to rubber involve the use of a resorcinol-aldehyde resin blended with a rubber latex. Basically the adhesive consists of an aqueous system comprising a rubber latex and a phenolic resin which causes the tire cord (usually a textile material) to adhere to the rubber because of the composite nature of the adhesive. The phenolic resin adheres strongly to the textile material, and the rubber latex adheres by vulcanization to the rubber that is to be bonded to the textile material.

This type of adhesive has been modified in a variety of ways. For example, instead of allowing the complete condensation of the phenol-aldehyde resin to take place within the composite structure of the adhesive during the vulcanizing procedure, the phenol-aldehyde condensate has been preformed by condensing a phenol with an aldehyde in an aqueous medium in the presence of an acid catalyst. In another instance, the tire cord has been treated first in a liquor comprising functional compounds having at least two ethylene-urea groups and two ethylene-urethane groups. U.S. Pats. 3,190,764 and 3,247,043 disclose the use of a polyepoxide in a so-called pre-dip adhesive. U.S. Pat. 3,240,659 discloses the first impregnation of the tire cord with an organic polyisocyanate, while U.S. Pat. 3,226,276 discloses a first treatment with a phenolic-aldehyde deficient resin followed by treatment with resorcinol-formaldehyde-rubber latex in which the resol had been blocked by a polyisocyanate. In addition to the above, the prior art discloses tire cord adhesives comprising an incompletely condensed phenolic resin and a copolymer of a conjugated diene and an unsaturated ketone, or a butadiene-acrylonitrile latex. A tire cord adhesive comprising an etherified polymethylolamine and a rubber latex has also been disclosed..

Use of the above disclosed adhesives and their corresponding methods for bonding tire cord to rubber entails certain serious disadvantages. For example, first treating the tire cord with a liquor containing dissolved or dispersed isocyanates requires large quantities of isocyanate and is costly; moreover, there is a problem of toxicity. Moreover, many of the prior art methods require two or more dipping steps which adds to the processing cost.

It is an object of this invention to provide an improved adhesive for bonding a reinforcing element to rubber. It is another object of this invention to provide a one-stage (single treatment step) bonding method for laminating a reinforcing element of textile material, such as tire cord, to rubber.

In accordance with this invention, the above objects are accomplished by treating a textile material used as a reinforcing element for rubber with an adhesive composition consisting of a mixture of a latex comprising a multifunctional polymer formed from methyl acrylate, ethylenically unsaturated carboxylate-group containing monomeric material and ethylenically unsaturated hydroxyl-group containing monomeric material with a blend of a phenolic-aldehyde resin and a rubber latex. More specifically, the multifunctional component consists of a copolymer formed from up to 20% by weight of hydroxyl-group containing monomeric material, up to 5% by weight of carboxylate-group containing monomeric material, and the balance is methyl acrylate (MA). The multifunctional polymer is mixed directly with the phenolic-aldehyde resin-rubber latex and applied to the reinforcing element in a one-stage treatment process. There is no need to prime the textile material before it is coated with the adhesive composition of this invention. This affords various obvious advantages over the sequential treatments of the prior art. The improved adhesive of this invention may be applied to the reinforcing element in any suitable fashion, such as dipping (this will be described more fully hereinbelow); then the components of the lamination are joined and the resulting composite is treated under vulcanizing conditions to convert the adhesive resin to the infusible state.

The mixing of the multifunctional polymer of this invention with the phenolic-aldehyde-rubber latex provides an adhesive that exhibits an unexpectedly high degree of bonding capability which is significantly in excess, about 10 to 25%, of the bonding ability of the phenolic-aldehyde-rubber latex adhesive alone; it is not known what causes this. The ethylenically unsaturated carboxylate-group or hydroxyl-group containing monomeric material from which the multifunctional polymer is formed may be selected from any such material that is copolymerizable with methyl acrylate.

Representative of the carboxylate-group containing monomeric materials (having pendant carboxylic acid groups, —COOH, or salts thereof, e.g. —COOH$_4$) are acrylic acid, methacrylic acid, crotonic acid, angelic acid, hydrosorbic acid, cinnamic acid, m-chlorocinnamic acid, p-chlorocinnamic acid, alpha-cyano cinnamic acid, umbellic acid, and other monoolefinic monocarboxylic acids; sorbic acid, alpha-methyl sorbic acid, alpha-ethyl sorbic acid, alpha-chloro sorbic acid, alpha-methyl-gamma benzal crotonic acid, beta (2-butenyl) acrylic acid, 2,4-heptadieneoic acid, 2,4 - pentadienoic acid, 2,4,6 - octatrienoic acid, 1-carboxyl-1-ethyl-4-phenyl butadiene-1,3, 2,6 - dimethyl decatriene-(2,6,8)-oic-10, alpha-beta isopropylidene propionic acid, alpha-vinyl cinnamic acid, alpha-isopropenyl-furfural acetic acid, alpha-isopropenyl-cinnamenyl acrylic acid, and other polyolefinic monocarboxylic acids; hydromuconic acid, glutaconic acid, maleic acid, fumaric acid, and other monoolefinic polycarboxylic acids; 3-carboxy-pentadiene-(2,4)-oic-1, muconic acid, and other polyolefinic polycarboxylic acids, alpha-chloro acrylic acid, ethacrylic acid, alpha-isopropylidene acrylic acid, alpha-styryl acrylic acid (2-carboxyl-4-phenyl butadiene-1,3), beta-vinyl acrylic acid (1-carboxy butadiene-1,3), alpha-vinyl acrylic acid, beta-acryloxy propionic acid, itaconic acid, other olefinically-unsaturated carboxylic acids possessing one or more olefinic carbon-to-carbon double bonds and one or more carboxyl groups, the alkali metal and ammonium salts of acrylic or methacrylic acid.

Representative of the hydroxyl-group containing monomeric material are beta-hydroxypropylmethacrylate (HPMA), 3-hydroxypropyl-acrylate, beta-hydroxyethylmethacrylate (HEMA), 3-hydroxyethyl-acrylate, and other polymerizable unsaturated alcohols.

It has been surprisingly discovered that the multifunctional polymer component of the improved adhesive of this invention is specific as to the methyl acrylate (MA) backbone disclosed above. The same degree of improved adhesion is not attainable when the MA backbone is replaced with other materials, such as, for example, butyl acrylate, butyl methacrylate, ethyl acrylate, methyl methacrylate, or combinations thereof. This specificity as to backbone material is not fully understood.

Representative of the rubber latex component of the improved adhesive of this invention are natural rubber, copolymers of vinyl pyridines and diene hydrocarbons, such as a copolymer of alpha-vinyl pyridine/butadiene, vinyl pyridine/isoprene, 5-ethyl-2-vinyl pyridine/butadiene, 5-ethyl-2-vinyl pyridine/isoprene, copolymers of butadiene/styrene, butadiene/styrene/acrylonitrile, butadiene/acrylonitrile, butadiene/styrene/chloroprene, butadiene/styrene/vinyl pyridine and mixtures thereof. See U.S. Pat. Re. 23,451 for other suitable rubber latices.

The phenolic-aldehyde component or resol includes any condensation product of an aldehyde with a monomeric phenol which, under the influence of heat, becomes permanently infusible. The preferred resol is an adduct of resorcinol and formaldehyde. See U.S. Pat. Re. 23,451 for other suitable resols.

The manner of blending the rubber latex with the phenol-aldehyde heat convertible resol is disclosed in U.S. Pat. Re. 23,451. In the practice of this invention, blends of the rubber latex and the phenol/aldehyde resin containing from 10% to 90% resin may be employed. In general, for tire cord application, it is preferred to operate within the range of 20% to 60% resin, particularly from 25% to 40% resin.

The multifunctional polymer is mixed with the phenol-aldehyde-rubber latex (R-F-L) blend in the ratio (based on the weights of the solids) of about 5/95 to about 30/70. Optimum adhesion is obtainable when the copolymer/R-F-L ratio is from about 10/90 to about 20/80. The relative proportion of the R-F-L component to the multifunctional component will vary according to the specific carboxylate-group or hydroxyl-group containing materials that are present in the copolymer. It has been discovered that in the multifunctional copolymer component of the adhesive excellent results are obtained when the proportional relationship between the hydroxyl-group containing material and the carboxylate-group containing material is in the ratio of from about 2/1 to 10/1.

Many different reinforcing cords are used to reinforce rubber, including those made from a regenerated cellulosic material, such as viscose rayon or cuprammonium cellulose rayon, a polyamide, such as nylon; a polyester, such as Dacron (a high molecular weight polyethylene terephthalate); a metal, such as steel; and others. The preferred reinforcing cords in this invention are textile materials which will be more fully defined hereinbelow.

Among the rubber compounds to be reinforced as used in this invention are polymers of isoprene, such as natural rubbers and synthetic rubbers which include vulcanizable polymers of a conjugated diene including butadiene, a butadiene/styrene copolymer, a butadiene/acrylonitrile copolymer (acrylonitrile/butadiene/styrene), polymers of chloroprene, such as Neoprene, butyl rubbers containing a major proportion of isobutylene with a minor amount of butadiene, and stereorubbers, such as cis-1,4-polyisoprene and cis-1,4-polybutadiene.

The improved adhesive of this invention may be applied to the tire cord in any convenient fashion, e.g. by dipping, padding or spraying. The amount of adhesive material applied to the tire cord will vary depending, for example, upon the weight and construction of the tire cord material. Typically the amount of add-on solids to be applied to the textile material will usually fall within the range of from 1 to 25% by weight of the reinforcing cord, but it will be realized that the specific amount of add-on solids necessary to give maximum bonding will vary from one situation to another. In a dipping process, the concentration of the adhesive composition, the travelling speed of the reinforcing cord through it, and the tension under which the cord is held are adjusted so that after drying, the cord has a coating of dried adhesive composition within the 1 to 25% range supra. The preferred range of pick-up or amount of add-on solids is from about 6 to 15% by weight of the reinforcing cord.

The impregnated reinforcing cord is then subjected to a drying treatment, preferably within a tunnel in which hot air is circulating, both in order to eliminate the moisture contained in the coating and to complete the condensation of the phenolic resin contained in the adhesive composition. Consequently, the drying operation is conveniently carried out at a temperature within the range of 120° to 250° C. and for a time sufficient to allow the complete conversion of the resin to an insoluble and infusible product.

In the case of reinforcing cord consisting of textile materials formed from synthetic fibers, such as, for example, polyamide fibers, which require a heat treatment for their stabilization, this treatment may be effected by passing the textile material through two or more heating zones at different temperatures so as to allow a regular carrying out of the operations of drying and stretching as is already known in the art.

The expression "textile material" as used herein includes any thread, yarn, cord or fabric obtained from natural fibers, fibers of regenerated cellulose or synthetic fibers, such as for instance, those produced from polyamide or polyester resins.

The treated and dried textile material is then incorporated with the vulcanizable rubber compound to which it is to be bonded. Such a compound may be prepared with natural rubber or with any synthetic rubber obtained by polymerization or copolymerization of suitable organic compositions, and may also contain the usual ingredients necessary for vulcanization, such as fillers and the like.

The incorporation of the textile material in the compound of vulcanizable rubber may be carried out using various known methods; for example, a rubber layer may be applied by calendering onto one or both faces of the treated and dried textile material.

The product obtained may be used for the production of moulded composite articles constituted by rubber and fabrics, such as, for example, pneumatic tires, belts, tubes and the like.

During the moulding of such articles, at a suitable temperature, the vulcanization of the rubber compound of which they are made takes place, and at the same time, the vulcanizable component of the bonding agent is also vulcanized by means of vulcanizing agents migrating from the rubber compound.

To assist those skilled in the art to practice the present invention, the following modes of operation are suggested by way of illustration, parts and percentages being by weight and the temperatures in degrees C. unless otherwise specifically noted.

In the examples below, the measure of the strength of bonding between the reinforcing cord material and the rubber to be reinforced is determined by tests made in accordance with the method known as the "U-Hot-Test," devised, together with the appropriate apparatus, by Goodyear Tire & Rubber Co. and disclosed at the 79th Meeting of the American Chemical Society in Louisville, Ky., from Apr. 19 to 21, 1961, and described in U.S. Pat. 3,226,276.

EXAMPLE 1

(A) 11.6 gms. resorcinol and 12.8 gms. formaldehyde are dissolved in 311.6 gms. water to give a resol solution.

(B) A mixture of 75 parts of butadiene and 25 parts of alpha-vinyl pyridine is emulsified in 157 parts of an aqueous solution containing 4 parts of sodium oleate, 0.5 part of sodium hydroxide, 1 part of a formaldehyde/sodium naphthalene sulfonate condensation product, 1 part of potassium persulfate and 0.1 part of potassium ferricyanide. One half (½) part of lauryl mercaptan is added and the emulsion is heated for twenty hours at 40° C. in a sealed, glass lined vessel equipped for efficient agitation. The resulting smooth latex is treated with an antioxidant consisting of 2 parts of a phenyl-alpha-naphthylamine and diphenylamine (55/45) mixture dispersed in water. The dispersion contains about 40% solids.

(C) A 40% solids 75/25 butadiene/styrene rubbery copolymer is prepared in the same way as the polymer of (B) supra.

(D) 10.0 gms. of sodium hydroxide is added to the resol solution of (A) supra to catalyze resin formation, and immediately thereafter, 125 gms. of the butadiene/vinyl pyridine latex of (B) and 125 gms. of the stydene/butadiene latex of (C) is added to the resol solution (A)

The resulting blend is aged between 12 to 24 hours. Thereafter, it is diluted to about 20% solids.

(E) A multifunctional copolymer is formulated by employing a two charge polymerization technique with a redox system and a nonionic emulsifier.

RECIPE

| Materials | Charge 1 | Charge 2 |
|---|---|---|
| Water, deionized | 8,000 mls. | 1,800 mls. |
| Triton X405 [1] | 160 gms. | 160 gms. |
| Methyl acrylate (MA) | 2,500 gms. | 2,500 gms. |
| Beta-hydroxypropyl methacrylate | 600 gms. | 600 gms. |
| Acrylic acid (AA) | 60 gms. | 60 gms. |
| Sodium persulfate | 10 gms. | 5 gms. |
| Sodium formaldehyde sulfoxylate | 2 gms. | 1.5 gms. |
| FeSO₄.7H₂O | 0.5 gm. | |

[1] Triton X405 is an octylphenoxypolyethoxy ethanol having forty oxyethylene units.

The reactor is flushed with nitrogen. The materials of charge 1 are added and polymerization medium is stirred until it cools to about 35° C. The materials of charge 2 are added and the polymerization medium is again stirred until the reaction is completed. The final product is then cooled and filtered. The latex of multifunctional copolymer is diluted to about 20% solids.

(F) The pH of emulsion copolymer (E) is adjusted to about 6 with ammonium hydroxide, then it is mixed with a blend of (D) in the weight ratio of 5/95 (based on the weight of the solids).

EXAMPLE 2

(A) A nylon tire cord of conventional construction is passed under slight tension through the adhesive composition obtained in Example 1(F) at the rate of six feet per minute. It is then dried under about 5 pounds tension for about 1.5 minutes in air at about 215° C. The treated nylon cord is then distributed in a reinforcing fashion throughout a conventional, uncured synthetic rubber (GR-S) stock, which is a commercial synthetic rubber composed approximately of a 75%–25% butadiene/styrene interpolymer prepared according to U.S. Pat. 1, 938,731. The ends of the cord are embedded in the rubber stock and the cord projects from the rubber stock in the form of a loop. The whole assembly is cured in a mold at 150° C., under 10,000 pounds pressure for 20 minutes. After conditioning overnight, the loops are then connected to an Instron tensile tester and the laminate is heated at 120° C. for 3 minutes. A tensile force is applied to the loop and increased until one of the legs of the cord is removed from the rubber. The force necessary to pull the ends of the cord from the rubber is about 29.0 pounds.

(B) A similar pull test is conducted on a laminate comprising a cord that is treated with merely the blend of Example 1(D) (standard R-F-L dip). The tensile force necessary to pull the end of the cord from the rubber is only about 22.9 pounds.

EXAMPLE 3

An adhesive composition is formulated in the same way as in Example 1, except the emulsion copolymer obtained in 1(E) is modified by using a total of 300 gms. of acrylic acid instead of a total of 120 gms.

EXAMPLE 4

A Dacron tire cord of conventional construction is used in place of the nylon cord of Example 2. The Dacron cord is treated with the adhesive composition obtained in Example 3 in the same way that the nylon cord is treated in Example 2. The measure of the strength of the bond between the reinforcing cord material and the rubber to be reinforced is determined in the same way as in Example 2. The force necessary to pull the ends of the cord from the rubber is about 1.5 pounds. A similar pull test on a laminate comprising a Dacron cord that is treated with merely the standard R-F-L dip alone requires a tensile force necessary to pull the end of the cord from the rubber of only about 1.0 pounds.

EXAMPLE 5

An adhesive composition is formulated in the same way as in Example 1, except the ratio of the emulsion copolymer of 1(E) to the blend of 1(D) is 30/70.

EXAMPLE 6

A nylon tire cord similar to the one used in Example 2 is treated with the adhesive composition obtained in Example 5 in the same way as the cord is treated in Example 2. The pull tests are conducted in the same way as Example 2.

The force necessary to pull the ends of the cord from the rubber is about 27 pounds. The force necessary to pull the ends of the cord treated with merely the standard R-F-L dip from the rubber is only about 23 pounds.

EXAMPLE 7

An adhesive composition is formulated in the same way as in Example 1, except the emulsion copolymer obtained in 1(E) is modified by using a total of 240 gms. of acrylic acid instead of a total of 120 gms., and the ratio of the emulsion copolymer of 1(E) to the blend of 1(D) is 15/85.

EXAMPLE 8

A nylon tire cord similar to the one used in Example 2 is treated with the adhesive composition obtained in Example 7 in the same way as the cord is treated in Example 2. The pull tests are conducted in the same way as Example 2.

The force necessary to pull the ends of the cord from the rubber is about 28 pounds. The force necessary to pull the ends of the cord treated with merely the standard R-F-L dip from the rubber is only about 22 pounds.

EXAMPLE 9

A rayon tire cord of conventional construction is used in place of the nylon cord of Example 2. The rayon cord is treated with the adhesive composition obtained in Example 3 in the same way that the nylon cord is treated in Example 2.

It is to be understood that changes and variations may be made without departing from the spirit and scope of the invention as defined by the appended claims.

I claim:
1. A rubber reinforcing material comprising essentially a cellulosic or nylon textile fabric material carrying from about 1 to 25 weight percent of residual solids retained from a dried adhesive composition, said composition consisting essentially of a mixture of
   (a) a multifunctional copolymer of methyl acrylate, up to 20 weight percent of a hydroxyalkyl acrylate or methacrylate, and up to 5 weight percent of ethylenically unsaturated carboxylate-group containing monomeric material with
   (b) a blend of a phenolic-aldehyde resin and a rubber latex,
said mixture having a multifunctional copolymer to phenolic-aldehyde-rubber latex ratio of from about 5 to 95 to about 30 to 70, based on the weight of the solids.

2. In a method for producing a fabric-reinforced rubber article which involves the steps of applying an adhesive composition to a textile fabric formed of nylon or cellulosic fibers and then bringing a vulcanizable natural or synthetic rubber layer into contact with at least one face of the adhesive-coated textile fabric and subsequently heating the assembled composite structure thereby obtained to cure the adhesive and vulcanize the rubber, the improvement which consists in using as the adhesive a mixture of
   (a) a copolymer of methyl acrylate, up to 20% by weight of a hydroxyalkyl acrylate or methacrylate, and up to 5% by weight of ethylenically unsaturated carboxylate group-containing monomeric material with
   (b) an aqueous dispersion of a blend of a phenolic-aldehyde resin and a rubber latex,
the weight ratio of the copolymer solids to the total solids of the phenolic resin and rubber latex being from about 5 to 95 to about 30 to 70.

3. A method in accordance with claim 2 in which the amount of adhesive composition applied to the textile is from 1 to 25% by weight, based on the dry weight of the textile material, and the phenolic resin is a resorcinol-formaldehyde condensate.

4. A method according to claim 3 wherein the textile material is formed from rayon fibers.

5. A method in accordance with claim 3 wherein the textile material is formed from cotton fibers.

6. A method according to claim 3 wherein the textile material is formed from polyamide fibers.

7. A composite article obtained by the method of claim 2.

8. An adhesive adapted to adhere natural or synthetic rubber to a reinforcing element therefor formed of polyamide or rayon or cotton fibers which comprises a mixture of
   (a) a copolymer of methyl acrylate, up to 20% by weight of a hydroxyalkyl acrylate or methacrylate, and up to 5% by weight of ethylenically unsaturated carboxylate group containing monomeric material with
   (b) a blend of a phenolic-aldehyde resin and a rubber latex,
the ratio of the solids of the copolymer to the total solids of phenolic resin and rubber latex being from about 5 to 95 to about 30 to 70% by weight.

References Cited

UNITED STATES PATENTS

| | | | |
|---|---|---|---|
| 3,201,374 | 8/1965 | Simms | 260—80.5 |
| 3,256,137 | 6/1966 | Danielson | 161—241 |
| 3,262,482 | 7/1966 | Clifton | 152—330 |
| 3,304,280 | 2/1967 | Senior | 260—32.8 |
| 3,408,249 | 10/1968 | Brown | 161—241 X |

JOHN T. GOOLKASIAN, Primary Examiner

C. B. COSBY, Assistant Examiner

U.S. Cl. X.R.

117—138.8, 145, 146; 156—110, 334, 335, 338; 161—88, 241, 242, 252, 257; 260—3, 4, 29.3, 29.7, 844, 845, 846, 887